March 3, 1953     S. E. LITT     2,630,062
AUTOMATIC EGG COOKING DEVICE

Filed Feb. 19, 1951     2 SHEETS—SHEET 1

INVENTOR.
SIDNEY E. LITT
BY
ATTORNEY

March 3, 1953 S. E. LITT 2,630,062
AUTOMATIC EGG COOKING DEVICE
Filed Feb. 19, 1951 2 SHEETS—SHEET 2
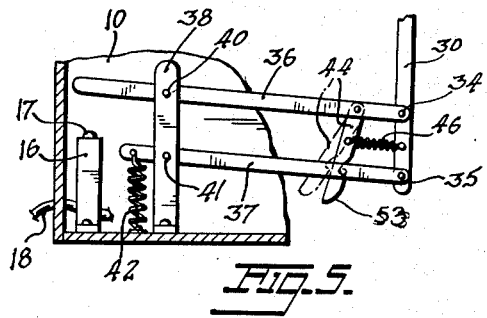
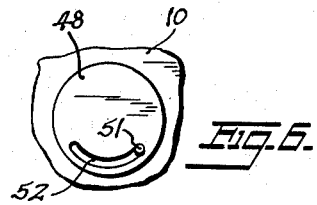
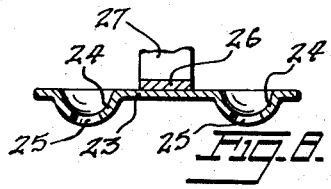
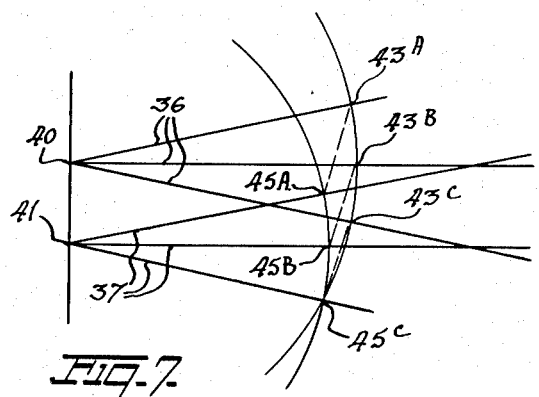
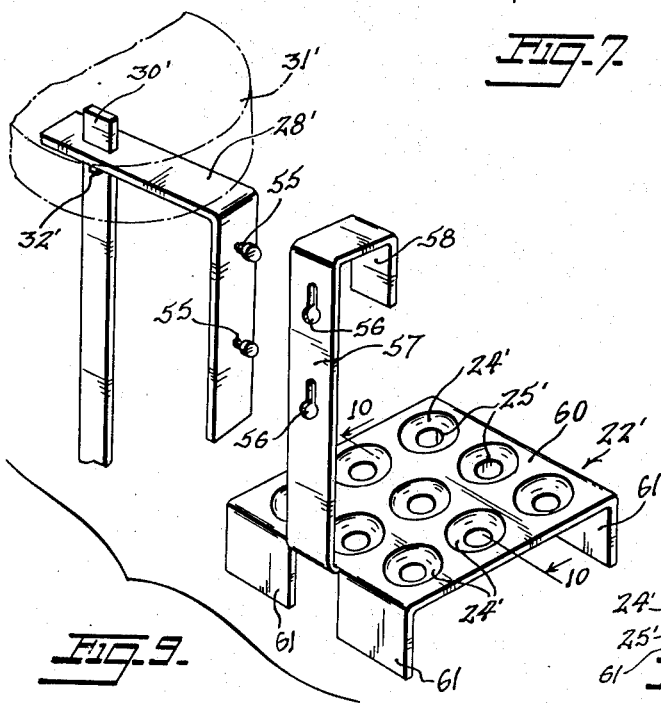
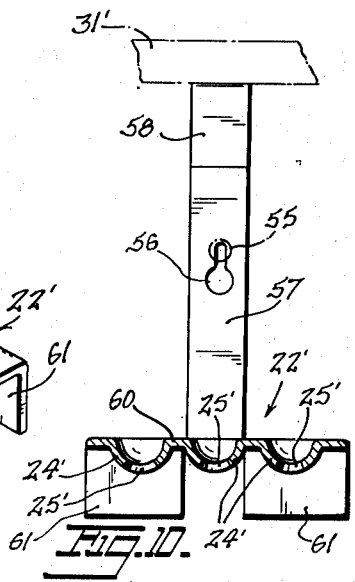
INVENTOR.
SIDNEY E. LITT
BY
ATTORNEY Patented Mar. 3, 1953

2,630,062

UNITED STATES PATENT OFFICE 2,630,062

AUTOMATIC EGG COOKING DEVICE

Sidney E. Litt, Elkins Park, Pa.

Application February 19, 1951, Serial No. 211,717

2 Claims. (Cl. 99—327)

This invention relates to kitchen appliances, and, more particularly, to an automatic egg cooker especially adapted to restaurant use.

One object of the invention is the provision of a device of the type described which is adapted to cook a plurality of eggs to any predetermined degree of hardness.

Another object of the invention is to provide simple but highly effective means for maintaining the eggs in a cooking container for the required length of time and for removing them therefrom when said time has expired.

A modified form of the invention has for its object to provide a simple and economical tray or carriage for a plurality of eggs, said carriage being mountable in the device for automatic cooking operations but being readily removable therefrom for portage of said eggs.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 5 is a view similar to a portion of Fig. 2 showing a different position of the parts.

Fig. 6 is a fragmentary view of a timing device shown also in Figs. 1 and 4.

Fig. 7 is a diagram of the movements of certain operating parts of the invention.

Fig. 8 is an enlarged sectional view on line 8—8 of Fig. 1.

Fig. 9 is an enlarged perspective view of a modified egg carrier.

Fig. 10 is a sectional view on line 10—10 of Fig. 9.

Figure 1:
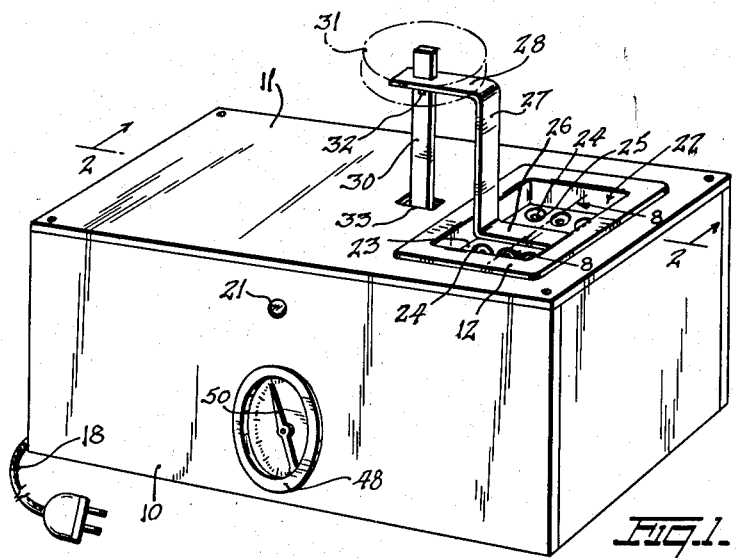
Fig. 1 is a perspective view of the device of the invention.
Figure 2:
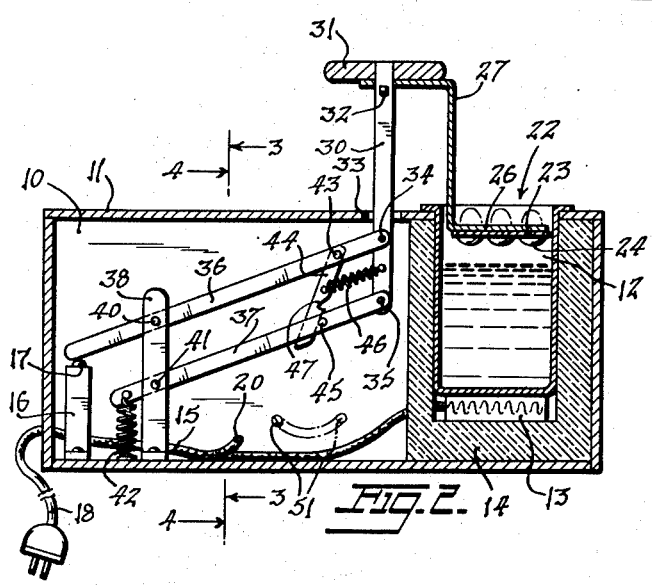
Fig. 2 is a longitudinal vertical sectional view on line 2—2 of Fig. 1.
Figure 4:
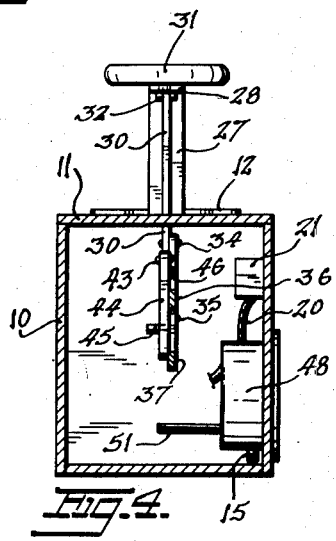
Fig. 4 is a transverse vertical sectional view on line 4—4 of Fig. 2.
Figure 3:
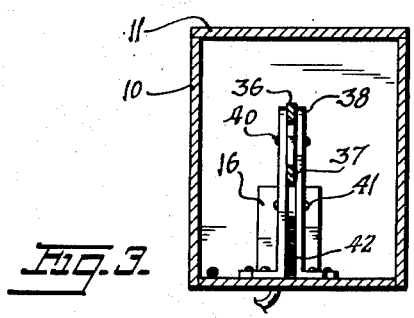
Fig. 3 is a transverse vertical sectional view on line 3—3 of Fig. 2.

The automatic egg cooking device according to the first form of the present invention, shown in Figs. 1 to 8, includes a rectangular box or cabinet 10 having a removable top piece 11. Mounted in a suitable opening in said top piece near one end thereof is a well-like container 12 for boiling. Located beneath the container 12 is a heating unit 13 which, with the container, is encased in an asbestos block 14 or in any other form of heat insulation. For operating heater 13 there is provided a power line 15 which extends to a switch 16 having a button 17 depressible to connect said line 13 with an external line 18. A branch 20 of line 15 leads to a suitable signal light 21 for indicating the condition of the heater 13 as off or on.

Located in container 12 is a tray 22 which comprises a plate 23 having at either side thereof a row of indentations 24 each with an opening 25 in the bottom thereof. In obvious manner each indentation is adapted to receive an egg to be cooked, see also Fig. 8. Plate 23 is centrally secured by welding or the like to the horizontal tail 26 of an upright bar 27 which at its upper end is provided with a horizontal extension 28. Near its end extension 28 is provided with a suitable slot through which the upper end of a bar 30 extends into a palm operated block 31 in which it is secured. A keeper 32 extends through bar 30 immediately below extension 28 to maintain the relative positions of the parts.

Bar 30 extends downward into cabinet 10 through a slot 33 in the top piece 11 thereof. Inside cabinet 10 bar 30 has pivoted thereto at 34 and 35, upper and lower parallel bars 36 and 37, respectively. The bars 36 and 37 are also pivoted between blocks 38 mounted on the floor of the cabinet as indicated at 40 and 41. Lower bar 37 extends beyond pivot 41 and is engaged by a spring 42 which maintains bar 30 in the upper position shown in Fig. 2. Bar 36 also extends beyond its pivot 40 and engages the switch button 17 so that said switch is opened when the parts are in their normal raised portions, shown in Fig. 2, and the heater 13 normally is off.

Near bar 30, upper bar 36 has pivoted thereto at 43 a latching arm 44 which is drawn counter-clockwise against a stud 45 by a spring 46. Stud 44 is mounted on the lower bar 37 at a greater distance from bar 30 than the pivot 43 of arm 44. Said arm thus is tilted away from bar 30 as it extends downward. A latching notch 47 is provided in the edge of arm 44 adjacent stud 45 and is adapted, when arm 30 is depressed to the lower position of Fig. 5, to engage the stud 45 and lock the parts in their lower positions.

Referring now to the diagram of Fig. 7, it will be seen that the pivot 43 of latch arm 44 and the stud 45 swing through arcs which converge as the bar 30 is depressed and intersect one another at the lowermost position of stud 45. Thus, in the upper position of the parts the stud, indicated by 45A, is spaced a definite distance from the pivot of arm 44, indicated by 43A, and said stud cannot engage in the notch 47. As bar 30 is moved downward to a central position, that in which parts 43 and 45 are provided with the suffix B, said spacing decreases, but the stud is still unable to engage in the notch. However, in the lowermost or C position of the parts said spacing is decreased to the point where said stud does engage in the notch and the parts are locked in their lowermost positions.

The construction thus far described is such that normally heater 13 is off, but the water is already hot from previous use or as a result of having been filled with hot water. After placing the requisite number of eggs on tray 22 the bar 30 is depressed through palm block 31, thus lowering the eggs into the water. The eggs then are maintained in the water by the latching arrangement just above described. Depression of palm block 31 also allows switch button 17 to rise, closing the switch 16 to turn on the heater 13 while the eggs are in the water.

In order to provide for removing the eggs from the water after a predetermined length of time the following means are provided.

An ordinary timer 48 having a settable pointer 50 is secured in the front wall of cabinet 10 and is provided with a tripping rod 51 which extends from an arcuate slot 52 in the rear face thereof, see Figs. 2, 4, 5 and 6. As shown, the slot 50 is located in the lower portion of the timer for the rod 51 to clear the lower parallel bar 37. As the timer pointer 50 is set, rod 51 is moved along slot 52 the desired amount after which it advances in the opposite direction to the end of the slot. The latch arm 44 extends below the lower parallel bar 37 and is provided with a rounded nose 53 for engagement by the rod 51 as the latter advances to the said end of the slot.

The construction is such that when the palm block 31 is depressed and the timer set, rod 51, after a time lapse predetermined by the setting of the timer, engages nose 53 and disengages notch 47 from stud 45. This allows spring 42 to raise the mechanism to its normal position in which the tray 22 and the eggs carried thereby are positioned above the water in container 12.

Referring now to the modification of the invention illustrated in Figs. 9 and 10 wherein like parts are given the same reference numerals as hereinbefore with a prime added, there is disclosed a modified form of the invention by which the number of eggs that can be accommodated is increased and by which the egg supporting tray is removable for portage of the eggs.

As shown, the bar 27' is not provided with a tail 26 as before but rather is provided with a pair of vertically spaced headed screws or studs 55 adapted to be engaged in a pair of inverted keyhole slots 56 in a bar 57. Bar 57 is bent at its upper end to form a finger grip 58 and at its lower end is bent off from one end of a plate 60 which forms the major part of an egg tray 22'. Plate 60 is provided at each corner with a downturned leg 61 on which the tray 22' may be supported. The surface of plate 60 is provided with as many indentations 24' as possible, each of which has an opening 25' in the base thereof.

The construction is such that the tray 22' may be secured to bar 27' by means of the studs 55 and slots 56 for egg cooking operations as described above, but may be removed for carrying the eggs to a place of use thereof while another tray of eggs is attached to bar 27'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automatic egg cooker comprising, a container for a quantity of hot water, a tray located in said container above said water and including a plate having therein a plurality of egg receiving depressions each with an opening in the bottom thereof and a bar having a lower horizontal extension to which said plate is secured, manually operable means for lowering said tray into said water, said lowering means comprising a pair of parallel bars and a vertical bar to which one end of said parallel bars is pivoted and upon which said tray is supported, a latch lever pivoted to one of said parallel bars adjacent said vertical bar, said latch lever having therein a notch, a stud fixedly mounted on the other parallel bar at a greater distance from said depressible bar than the pivot of said latch lever, a spring for drawing said latch lever against said stud, said stud engaging in said notch when said depressible bar is depressed and latching the latter in depressed position, and a settable timer including a trip for releasing said latch lever from said stud.

2. An automatic egg cooker comprising a container for a quantity of hot water, a tray located in said container above said water and including a plate having therein a plurality of egg receiving depressions each with an opening in the bottom thereof, a bent down leg at each corner of the plate, a bar extending upward from one end of the plate and having at its upper end a finger grip, said bar having a pair of inverted keyhole slots, manually operable means for lowering said tray into the water, said lowering means comprising a pair of parallel bars and a manually depressible vertical bar to which one end of said parallel bars is pivoted, a second bar mounted on said depressible bar and extending downward into said container, a pair of headed studs projecting from said second bar and engaged in said slots, a latch lever pivoted to one of said parallel bars adjacent said depressible vertical bar, said latch bar having a notch therein, a stud fixedly mounted on the other parallel bar at a greater distance from said depressible bar than the pivot of said latch lever, a spring for drawing said latch against said stud, said stud engaging in said notch when said depressible bar is depressed and latching the latter in depressed position, and a settable timer including a trip for releasing said latch lever from said stud.

SIDNEY E. LITT.

REFERENCES CITED

The following references are of record in the file of this patent:

UNITED STATES PATENTS

| Number | Name | Date |
|---|---|---|
| Re. 21,336 | Graham | Jan. 30, 1940 |
| 1,377,983 | Lamb | May 10, 1921 |
| 1,921,173 | Maur | Aug. 8, 1933 |
| 1,977,454 | Price | Oct. 16, 1934 |
| 2,222,314 | Husk | Nov. 19, 1940 |
| 2,288,699 | Gomersall et al. | July 7, 1942 |
| 2,372,978 | Pelenberg | Apr. 3, 1945 |
| 2,470,548 | Des Jardins | May 17, 1949 |